United States Patent
Negishi et al.

(10) Patent No.: US 7,401,129 B2
(45) Date of Patent: Jul. 15, 2008

(54) NETWORK SYSTEM, SERVER, DATA PROCESSING METHOD AND PROGRAM

(75) Inventors: Yashushi Negishi, Machida (JP); Hiroki Murata, Tokyo-to (JP); Kenichi Okuyama, Kawasaki (JP); Kazuya Tago, Machida (JP)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 10/828,692

(22) Filed: Apr. 21, 2004

(65) Prior Publication Data

US 2005/0021657 A1    Jan. 27, 2005

(30) Foreign Application Priority Data

Apr. 21, 2003    (JP)    ............................. 2003-115756

(51) Int. Cl.
G06F 15/16    (2006.01)
(52) U.S. Cl. ..................... 709/219; 709/202; 709/216; 709/246; 707/1; 707/10
(58) Field of Classification Search ................ 709/202, 709/216, 219, 246; 710/1, 10
See application file for complete search history.

(56) References Cited

U.S. PATENT DOCUMENTS

| 6,792,424 | B1 * | 9/2004 | Burns et al. ..................... 707/9 |
| 6,868,439 | B2 * | 3/2005 | Basu et al. .................. 709/213 |
| 7,103,617 | B2 * | 9/2006 | Phatak ...................... 707/201 |
| 7,165,096 | B2 * | 1/2007 | Soltis ......................... 709/217 |
| 2003/0033383 | A1 * | 2/2003 | Elnozahy et al. ............ 709/219 |
| 2004/0111486 | A1 * | 6/2004 | Schuh et al. ................ 709/214 |
| 2005/0021657 | A1 * | 1/2005 | Negishi et al. .............. 709/213 |

FOREIGN PATENT DOCUMENTS

| JP | 07049880 | 9/1995 |
| JP | 08-212090 | 8/1996 |
| JP | 09-026904 | 1/1997 |
| JP | 10-040146 | 2/1998 |
| JP | 2001-084257 | 3/2001 |

* cited by examiner

*Primary Examiner*—Michael Won
(74) *Attorney, Agent, or Firm*—Dillon & Yudell LLP

(57) ABSTRACT

A front-end server for temporarily holding an operation request for a NAS server, which is sent from a predetermined client, is interposed between the NAS server and clients on a network. This front-end server holds information concerning a correlation among data files stored in the NAS server, optimizes the operation request received from the client based on the information, and transmits the operation request to the NAS server.

5 Claims, 7 Drawing Sheets

FIG. 4

| HANDLE | RECEIVING TIME | REFLECTED STATE | PATH NAME | ATTRIBUTE | OFFSET | LENGTH | FILE CONTENT | REFERENCE ORDER INFORMATION | DEPENDENCY INFORMATION |
|---|---|---|---|---|---|---|---|---|---|
| | | | | | | | | | |
| | | | | | | | | | |
| | | | | | | | | | |

131

NETWORK SYSTEM, SERVER, DATA PROCESSING METHOD AND PROGRAM

PRIORITY CLAIM

This application claims priority of Japanese Patent Application No. 2003-115756, filed on Apr. 21, 2003, and entitled, "Network System, Server, Data Processing Method and Program."

BACKGROUND OF THE INVENTION

1. Technical Field

The present invention relates to memory management of a computer system, and particularly, to memory management realizing efficient memory allocation suitable for a NAS (Network Attached Storage) system.

2. Description of Related Art

Heretofore, a variety of computer systems including various types of hardware (terminals) interconnected through a network have been utilized. Among such computer systems, there is a system using a storage device (NAS: Network Attached Storage) to be used by being directly connected to the network. In this system, the NAS is made to function as an independent file server capable of allowing a data file (hereinafter, simply referred to as a file) to be shared among clients and the like through the network, and is adapted to be accessible from and usable by the clients on the network.

FIG. 7 is a diagram schematically showing a general configuration of a NAS server. As shown in FIG. 7, the NAS sever 700 includes the hard disk device (HDD) 701 as storing means, the file system 702 as managing means for the file, which is realized as a function such as a CPU controlled by a program, and the network interface 703 for realizing a network communication function. An exemplary file system 702 may be the JFS (Journal File System) from International Business Machines Corporation.

Having received a read request from a client through the network interface 703, the NAS server 700 reads data from the hard disk device 701 under the management of the file system 702. Then, the NAS server 700 returns the read data as a response to the client through the network interface 703. Moreover, the NAS server 700, having received a write request from a client, writes data into the hard disk device 701 under the management of the file system 702, and notifies a completion of the write as a response to the client after the write is finished.

To improve the performance of NAS server 700, heretofore a write cache has been provided in the NAS server 700. In data write operations, it takes an extended amount of time to write the data into the hard disk device 701 due to the mechanical nature of the hard disk device 701. Accordingly, a high-speed semiconductor memory (hereinafter, referred to as a cache memory) is often used as a write cache of the file system 702. The NAS server 700 temporarily stores the write data sent from the client in the cache memory, and at this point, notifies the client of the write completion. In such a way, the client recognizes the write completion, thus making it possible for the client to move to another process without waiting for an actual completion of the write processing into the hard disk device 701.

Moreover, the NAS server 700 writes the data accumulated in the cache memory in a way as described above into the hard disk in accordance with a load status of the hard disk device 701. By performing such control, processing efficiency of the NAS server 700 itself can be enhanced, and the performance thereof can be improved.

Furthermore, in order to avoid losing the data accumulated in the cache memory when the NAS server 700 is down due to a cause such as an unexpected accident, a non-volatile memory such as a flash memory has been used as this cache memory. In the case of using NFS as the file system 702, the non-volatile memory will be necessarily used for the cache memory because rules on protocol determine that a response to a client for a write request shall be returned after recording data in a non-volatile recording medium (Stable Storage).

One example of the NAS server 700 as described above is a RAID (Redundant Array of Independent (Inexpensive) Disks) system, which disperses accesses by use of a plurality of hard disk devices in combination to achieve improvements of a processing speed and reliability. Also in this RAID system, the improvement of the performance has been achieved by providing the cache memory as non-volatile memory.

As described above, the cache memory using the non-volatile memory has been generally provided in the NAS server, and as introduction methods thereof, there have been heretofore adopted a method for introducing the cache memory as a write cache of a file system, and a method for introducing the cache memory as a cache of the RAID system.

However, there has been a problem as below in the case of introducing the cache memory as the write cache of the file system. Specifically, in order that the file system utilizes the non-volatile memory as the write cache, it is necessary that the file system itself be designed to be capable of using the write cache. However, the file system for which various functions such as clustering, failover and snapshot are required already has a very complicated structure today. Therefore, it costs an enormous amount to change the existing file system and introduce the write cache. In the case of a software product realizing the NAS server, it is not preferable that the file system be changed to a great extent in order to introduce the write cache so as to meet specific hardware because a burden in terms of development cost is large. Moreover, for a vendor purchasing such software and selling the software in combination with hardware of his own, it is difficult to change the file system for reasons of technology and contract.

Furthermore, when the hardware in which the file system operates fails, this cache memory also becomes unusable simultaneously. Therefore, it is difficult for another device to access this cache and acquire the accumulated data for the purpose of maintenance and the like.

Meanwhile, in the case of utilizing the non-volatile memory as a part of a disk system as in the RAID system, it is possible for the file system to utilize the non-volatile memory completely transparently, and therefore, such a problem as inherent in the foregoing case of introducing the non-volatile memory as the write cache of the file system does not occur. However, there has been a problem as below even in this case. Specifically, in the case of introducing the non-volatile memory as the cache memory of the RAID system, operation requests (read and write requests) from the client are recorded in the cache memory on the RAID after processings thereof in the file system, a buffer system and a disk driver are finished. For this reason, great performance improvements in a response time to the client and a throughput of the NAS server itself cannot be expected.

In addition, the write request from the client affects a wider range of the file as processes are increased. Hence, when a large number of steps are performed before the write request is recorded in the cache memory, a required memory capacity for one write processing is increased, and thus utilization efficiency of the cache memory is reduced.

SUMMARY OF THE INVENTION

In this connection, in consideration of the foregoing problems, it is an object of the present invention to provide an effective cache system in a computer system utilized on a network.

It is another object of the present invention to realize efficient memory management in a NAS server by use of such a cache system.

The present invention achieving the foregoing objects is realized as a network system including a NAS server, and a front-end server and for temporarily holding at least one operation request for the NAS server, the operation request being sent from a client (computer or other terminal device) via the network. Here, this front-end server is characterized to hold information concerning a correlation among data files stored in the NAS server, convert the operation request based on this information, and transmit the converted request to the NAS server.

This front-end server functions as a cache system for the NAS server, which is interposed between the NAS server and the client, holds data read from the NAS server based on the operation request, and responds to the operation request received from the client by use of the holding data.

More specifically, this front-end server includes a cache memory for holding at least one operation request for the NAS server provided on the network and the data read from the NAS server based on the operation request, a client operation processing unit for receiving the operation request from a client on the network to perform an operation based on the operation request for cache data stored in the cache memory, and a data change reflection processing unit for creating at least one operation sequence to reflect the operation performed for the cache data by the client operation processing unit on the data file stored in the NAS server, and for transmitting the operation sequence to the NAS server.

More specifically, this client operation processing unit synthesizes a plurality of operation requests received from the client into one operation request, and performs an operation for the cache data. Moreover, the data change reflection processing unit merges a plurality of operations performed for the cache data by the client operation processing unit into one operation to create the operation sequence. Furthermore, when a first operation for the cache data affects other operations held in the cache memory, the data change reflection processing unit examines a dependency between the first operation and the other operations, and creates an operation sequence for each operation based on information concerning this dependency between the operations. In this case, the data change reflection processing unit determines the dependency between the first operation and the other operations based on the structure of the data files in the file system of the NAS server.

In the present invention, Network File Systems (NFS), as described by the Network Working Group, RFC 3010 and incorporated by reference in its entirety herein, can be used as the communication protocol between the NAS server and the front-end server. Of the different versions of NFS, NFSv4 (NFS version 4) has a function to send a call back to an NFS client (corresponding to the front-end server in the configuration of the present invention) to which management of the cache data is assigned when an access is made thereto from another NFS client. The use of this function enables a plurality of the front-end servers to be set for the NAS server. This is because an operation by a predetermined front-end server is notified to the other front-end servers by use of the callback function of the NFSv4, thus making it possible to maintain consistency of the operations of the front-end servers. Note that the communication protocol in this case is not limited to the NFSv4, and any communication protocol having a function to notify the operation by the predetermined front-end server to the other front-end servers can be used.

Furthermore, the present invention achieving the foregoing objects is also realized as a data processing method as below, which uses a computer connected to a network. This data processing method is characterized by including a step of storing, in a memory, an operation request for a NAS server received from a terminal device on a network, a step of converting this operation request stored in the memory based on an operation in the NAS server, and a step of transferring the converted operation request to the NAS server in accordance with a load status of the NAS server. Here, more specifically, a plurality of the operation requests are synthesized into one operation request based on a correlation among data files in the NAS server.

Moreover, the present invention can also be realized as a program for controlling a computer to function as the foregoing front-end server, or a program for allowing the computer to execute processing corresponding to each of the steps in the foregoing data processing method. This program can be provided by being stored in a magnetic disk, an optical disc, a semiconductor memory or other recording medium and distributed, or by being distributed through a network.

BRIEF DESCRIPTION OF THE DRAWINGS

For a more complete understanding of the present invention and the advantages thereof, reference is now made to the following description taken in conjunction with the accompanying drawings.

FIG. 4 is a view showing a configuration example of a cache management table according to this embodiment.

DETAILED DESCRIPTION OF THE PREFERRED EMBODIMENT

The present invention will be described below in detail based on an embodiment shown in the accompanying drawings.

Figure 1:
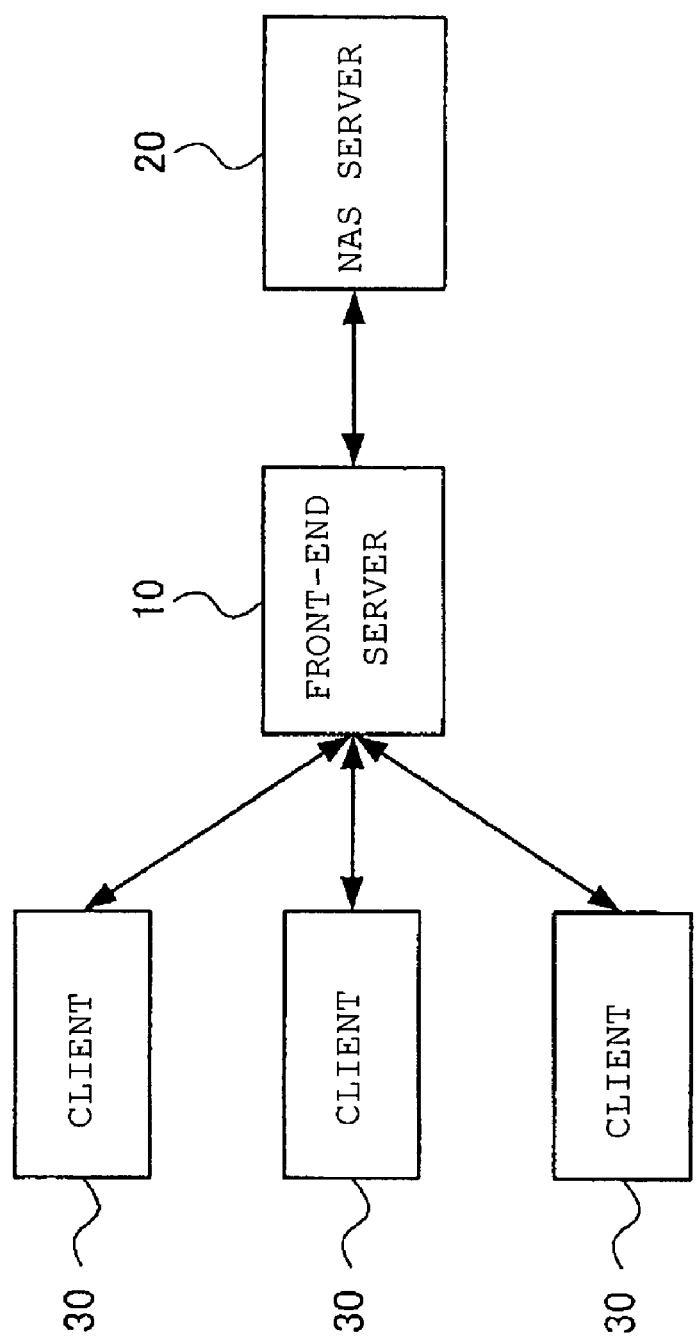
FIG. 1 is a diagram showing an entire configuration of a network system into which a cache system of this embodiment is introduced.

FIG. 1 is a diagram showing an entire configuration of a network system into which a cache system of this embodiment is introduced.

In the network system shown in FIG. 1, the front-end server 10, the NAS server 20 and the clients 30, all of which are according to the embodiment, are connected to one another through a network. In this network system, the clients 30 access the NAS server 20 through the front-end server 10.

Figure 7:
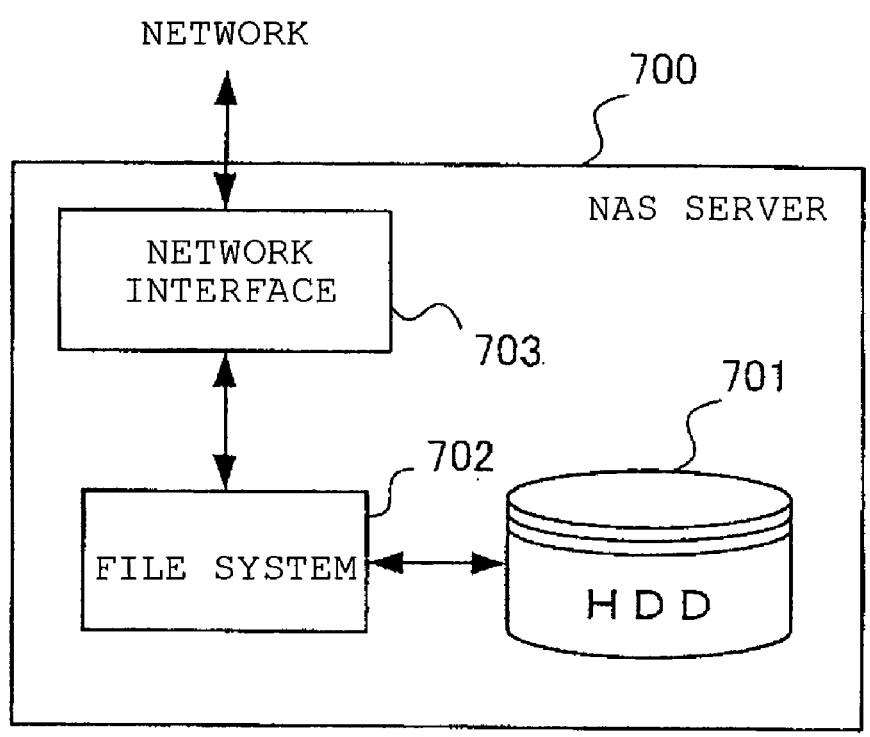
FIG. 7 is a diagram schematically showing a general configuration of a NAS server.

The front-end server 10 can be a personal computer, a workstation, or other computer devices. Meanwhile, the NAS server 20 is preferably an NAS server, such as shown and described in FIG. 7, but can alternatively be a general computer device such as a personal computer or a workstation. The clients 30 may be any information terminal such as a computer device, including the personal computer or the workstation, or a PDA (Personal Digital Assistant) provided with a network function, or a cellular phone.

Figure 2:
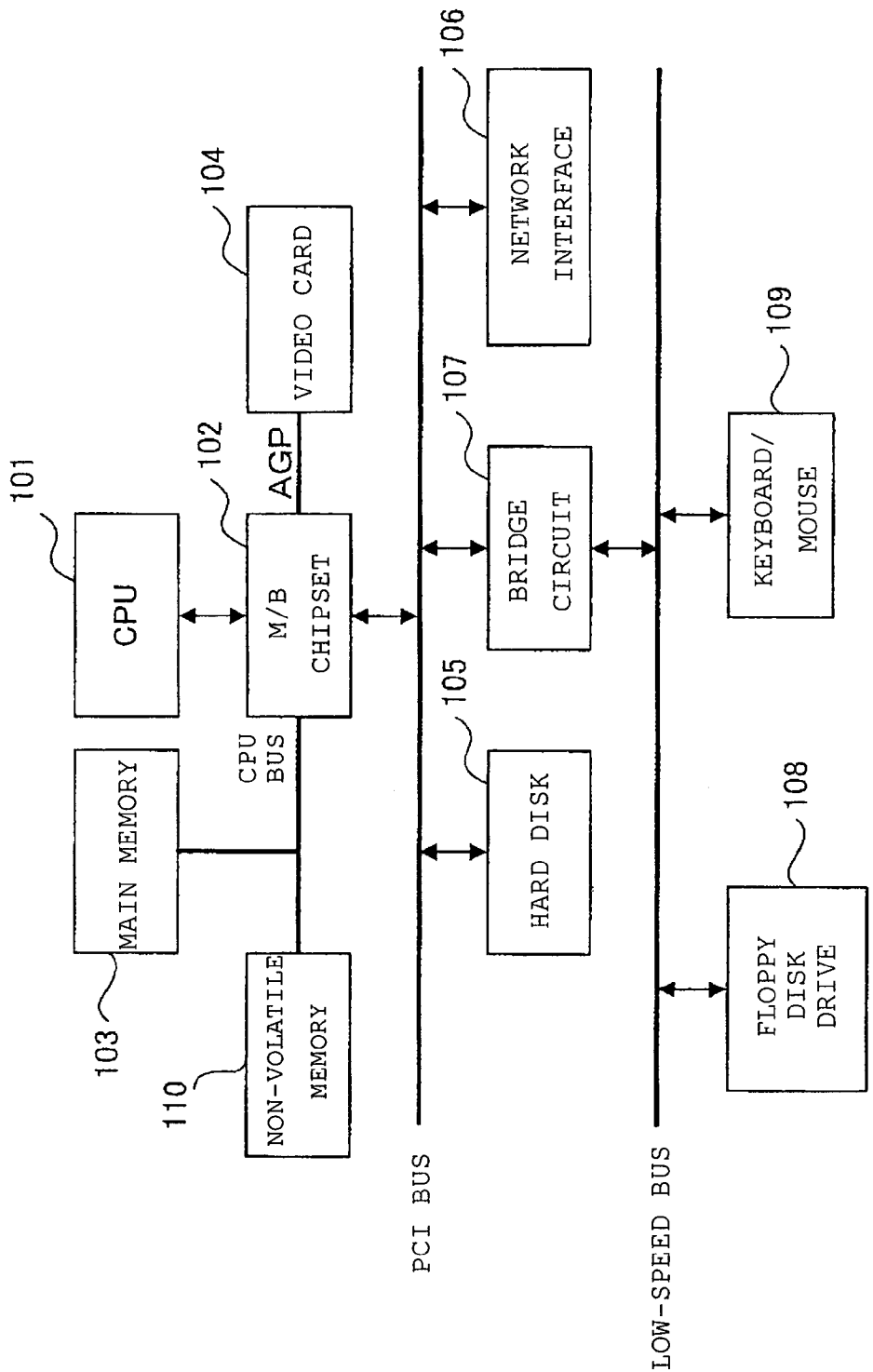
FIG. 2 is a diagram schematically showing an example of a hardware configuration of a computer device capable of realizing a front-end server of this embodiment.

FIG. 2 is a diagram schematically showing an example of a hardware configuration of a computer device capable of realizing the front-end server 10.

The computer device shown in FIG. 2 includes the CPU (Central Processing Unit) 101 as computing means, the main memory 103 and the non-volatile memory 110 to be used as a cache memory, both of which are connected to the CPU 101 through the M/B (motherboard) chipset 102 and the CPU bus, the video card 104 connected likewise to the CPU 101 through the M/B chipset 102 and the AGP (Accelerated Graphics Port), the hard disk 105 and the network interface 106, both of which are connected to the M/B chipset 102 through the PCI (Peripheral Component Interconnect) bus, and the floppy disk drive 108 and the keyboard/mouse 109, both of which are connected to the M/B chipset 102 through the PCI bus, the bridge circuit 107 and a low-speed bus such as the ISA (Industry Standard Architecture) bus.

Note that FIG. 2 shows only one example of the hardware configuration for front-end server 10, and that other various configurations can be adopted if this embodiment is applicable thereto. For example, a configuration may be adopted, in which only a video memory is mounted instead of providing the video card 104, and image data is processed by the CPU 101. Moreover, as an external storage device, a drive for a CD-R (Compact Disc Recordable) or a DVD-RAM ((Digital Versatile Disc Random Access Memory) may be provided through an interface such as ATA (AT Attachment) and SCSI (Small Computer System Interface). Furthermore, a configuration for performing all the control via the network interface without having the user interface is conceivable. In addition, a configuration without the hard disk and the floppy disk is also conceivable.

Figure 3:
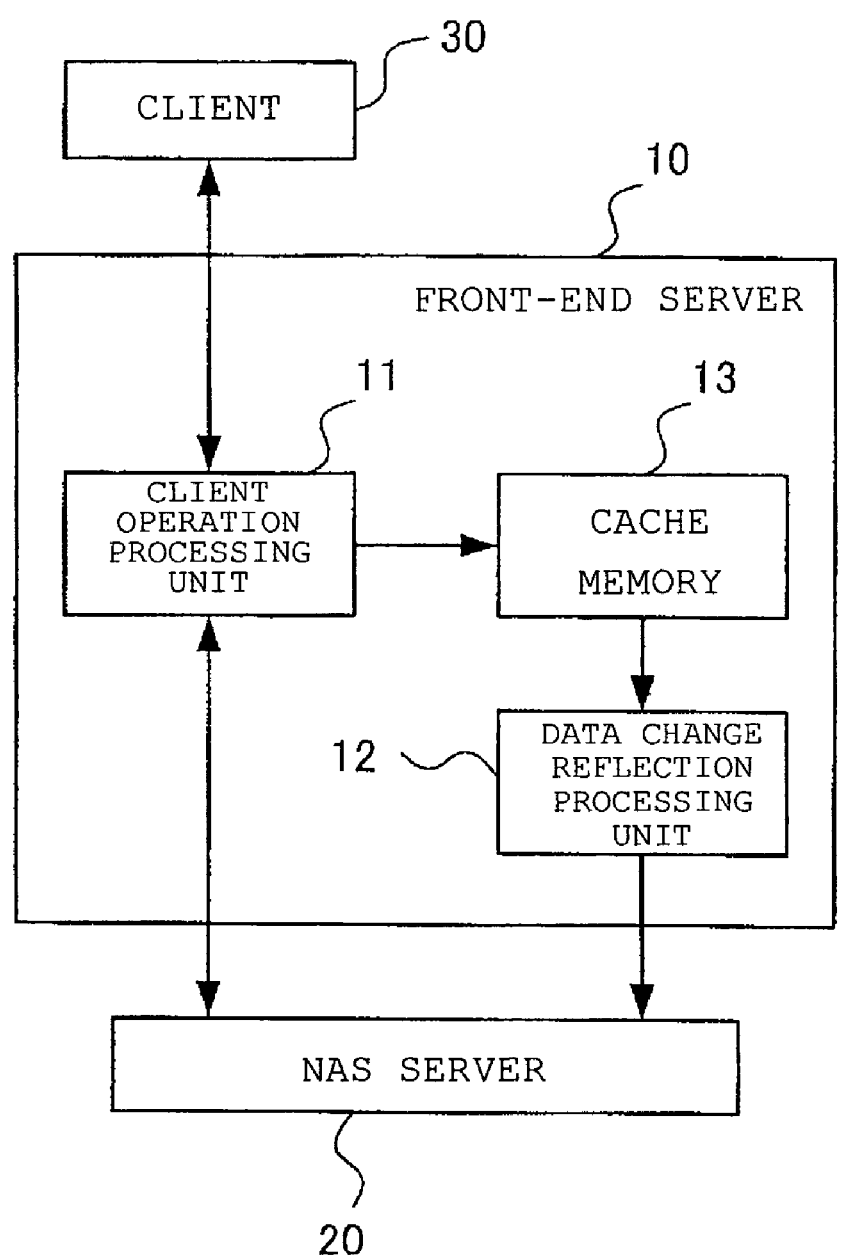
FIG. 3 is a diagram showing a functional configuration of the front-end server according to this embodiment.

FIG. 3 is a diagram showing a functional configuration of the front-end server 10 according to this embodiment.

As shown in FIG. 3, the front-end server 10 of this embodiment includes the client operation processing unit 11 for receiving an operation request from a client 30, the data change reflection processing unit 12 for performing an operation for the NAS server 20, and the cache memory 13 realized by the non-volatile memory 110 shown in FIG. 2. Client 30 is preferably coupled to front-end server 10 via a network (not shown).

In the configuration of the front-end server 10 described above, the client operation processing unit 11 and the data change reflection processing unit 12 are, for example, virtual software blocks realized by the CPU 101 controlled by a program in FIG. 2. The program controlling the CPU 101 can be provided by being stored in a magnetic disk, an optical disc, a semiconductor memory or other recording medium and distributed, or by being distributed through the network. Processings (processes) by the client operation processing unit and processings (processes) by the data change reflection processing unit 12 are independent of each other and executable in parallel.

The client operation processing unit 11 receives an operation request from the client 30 through the network interface 106 shown in FIG. 2, and processes the operation request by accessing the cache memory 13. Specifically, when the operation request is a read request, if data to be read in accordance with the read request is cached in the cache memory 13, the client operation processing unit 11 returns the data as a result of the read to the client 30. If the data to be read is not cached in the cache memory 13, the client operation processing unit 11 accesses the NAS server 20 and transmits the read request thereto, and then acquires read data and returns the read data to the client 30. The data read from the NAS server 20 in accordance with this read request is cached in the cache memory 13 as appropriate.

When the operation request from the client 30 is a write request, if data to be written in accordance with the write request is cached in the cache memory 13, the client operation processing unit 11 reflects a data change in accordance with the write request on the cached data, and performs a write completion notice to the client 30. If the data to be written is not cached in the cache memory 13, and if the data change cannot be performed due to an exclusive control and the like even though the data is cached, the client operation processing unit 11 stores the write request in the cache memory 13, and performs the write completion notice to the client 30.

Moreover, when it is possible to merge (synthesize) a plurality of the operation requests received from the client 30, the plurality of operation requests, if determined by client operation processing unit 11 to be compatible, can be merged into one operation request, and the merged request can be stored in the cache memory 13. For example, a plurality of write requests for a continuous area in one file, a plurality of change requests for access rights to the same file (on condition that other operations are not affected) or the like can be merged into one operation request. On the contrary to this, if the requested operations affect the other requested operations, such merging is not performed. For example, when operations of write authorization, write and write inhibition are executed for the same file in this order, the write-authorizing operation and the write-inhibiting operation cannot be merged into one operation because the last write-inhibiting operation makes inexecutable the write operation immediately there before. Hence, the operation requests for such operations are not merged. Meanwhile, when operations of write authorization, write and read authorization are executed in this order, operation requests for these operations can be merged into one operation because the last read-authorizing operation does not affect the write operation immediately there before.

Note that these plural processings (processes) by the client operation processing unit 11 can be executed in parallel.

The data change reflection processing unit 12 accesses the NAS server 20 through the network interface 106 shown in FIG. 2, and reflects, on a file stored in the NAS server 20, the data change made for the data on the cache memory 13 in accordance with the write request from the client 30 and the write request stored in the cache memory 13. Such reflection of the data change on the NAS server 20 is performed in such a manner that a data change operation sequence for the NAS server 20 is created based on the data change made for the data on the cache memory 13 or based on the write request stored in the cache memory 13 and is transmitted to the NAS server 20, and that this data change operation sequence is executed in the NAS server 20.

Note that these plural processings (processes) created by the data change reflection processing unit 12 can be executed in parallel in the NAS server 20. The data change reflection processing unit 12 is capable of pipelining merged plural processes and sending the pipelined merged processes to the NAS server 20, where they are executed on data stored in the NAS server 20 using parallel processing techniques known to those skilled in the art of parallel data processing.

Moreover, based on the premise that the operations on the NAS server 20 are executed by a method in which the same result as those of the processings performed on the cache of the front end is obtained, the data change reflection processing unit 12 examines the dependency between operations affecting other operations and operations affected by the other operations, and creates data change operation sequences such that the operations having such a dependency are executed under an orderly relation in accordance with the dependency. For example, a change of a directory name and a setting change of an access right to the directory affect accesses to all of the directories and files below the concerned directory. Hence, a setting change of the access right to the higher directory cannot be performed until change operations for the lower directories and files are performed. A specific processing method in accordance with this dependency conforms to a specification of communication protocol for use between the front-end server 10 and the NAS server 20.

Meanwhile, in consideration of the foregoing dependency between the operations, this creation processing of the data change operation sequences involves optimization processings such as conversion from a synchronous operation to an asynchronous operation and improvement of locality by a transposition of the operations, thus making it possible to contribute to the improvement of the performance as a whole of the system.

The conversion from a synchronous operation to an asynchronous operation means that the processing for creating the data change operation sequences and transmitting the data change operation sequences to the NAS server 20 is executed in accordance with the load status of the NAS server 20 (that is, asynchronously for the operation requests from the client 30).

The improvement of locality by a transposition of the operations means that a seek time of the hard disk in the NAS server 20 is reduced by transposing the operation when operations for different files do not affect other files even if a transposition of an operation thereof.

Note that these optimization processings are shown only as examples, and it is needless to say that various optimizations (operation conversions) realizable by interposing the cache memory 13 are executable.

It is possible to execute the processings (processes) by the client operation processing unit 11 and the data change reflection processing unit 12 in parallel, preferably by pipelining instructions. Moreover, each of the units can also execute a plurality of processings in parallel. The number of processings executable in parallel by the client operation processing unit 11 means the number of operation requests for the data read, which can be sent simultaneously to the NAS server 20. Meanwhile, the number of processings executable in parallel by the data change reflection processing unit 12 means the maximum number of operation requests for the data write, which can be sent simultaneously to the NAS server 20. These numbers of processings executable in parallel are set in accordance with the performance (processing speed) of the CPU 101 realizing the front-end server 10 and the storage capacity of the non-volatile memory 110. In addition, the numbers can also be dynamically adjusted in accordance with an arrival frequency of the operation requests sent from the client 30, the performance of the NAS server 20 and the like.

Moreover, in this embodiment, a cache management table is used in order to manage a cache content of the cache memory 13 in the processings of the client operation processing unit 11 and data change reflection processing unit 12. The foregoing parallel operations (at least the processings of the client operation processing unit 11 and data change reflection processing unit 12) enables simultaneous accesses made by two or more processings as accesses to the cache management table 131. Therefore, in accessing the cache management table 131, suitable exclusive control is necessary.

FIG. 4 is a view showing a configuration example of cache management table 131.

One entry of this cache management table 131 indicates a state of an attribute of the directory or the file and a cached state of the data. This cache management table 131 is basically held, for example, in the non-volatile memory 110 shown in FIG. 2. However, an entry that has already been reflected on the NAS server 20 and an entry to data read as processing for a read request may be managed by providing the cache management table 131 on a volatile memory such as the main memory 103.

In the example shown in FIG. 4, in the cache management table 131, there are prepared fields such as a handle, a receiving time, a reflected state, a path name, an attribute, an offset, a length, a file content, reference order management information and dependency information.

The handle is information for identifying the file or the directory, and depends on the communication protocol to be used by the system. In a reference operation as an operation based on the read request, this information is included in the operation request from the client 30. Meanwhile, in an operation based on the write request and a change operation as an operation reflecting the cache content on the NAS server 20, this information is included in the operation request from the client 30 and the response from the NAS server 20.

The receiving time indicates a receiving time of the write request from the client 30.

The reflected state indicates a reflected state of the data change based on the write request on the NAS server 20. For example, four values of "dependency resolution pending," "unprocessed," "under processing" and "end of processing" can be set therefore.

The path name is information (character string) indicating a location of the directory or the file in a tree structure of the file system of the NAS server 20. The tree structure here means a structure based on parentage in the directories and the files.

The attribute is information indicating an attribute of the file or the directory, and is defined by the communication protocol to be used by the system.

The offset is information indicating a location of data to be accessed in accordance with an operation request from a head of a file stored in the NAS server 20, and similarly, the length is information indicating a length of the data in the file.

The file content is a content of data managed by the concerned entry of the cache management table 131.

The reference order management information indicates a relative order of reference in entries. Although a management method for this information is arbitrary, for example, a method in which the reference order is shown by a bidirectional link is conceivable.

The dependency information indicates a dependency between the respective processings based on the operation requests. Although a management method for this information is arbitrary, for example, a method in which a link to a depending entry is placed in a dependency information field of an entry on which the depending entry depends is conceivable.

Note that the configuration of the cache management table 131 shown in FIG. 4 is shown only as an example, and that, besides the above, it is possible to register a variety of information usable for managing the cache as appropriate. For example, links for the parentage in the files and the directories and a hash table of file names may be registered in order to enhance a retrieval speed. Moreover, also conceivable is a method, in which information for estimating a future access possibility is registered in place of the reference order management information, and this information is used in the case of selecting an object to be deleted from the cache memory 13 and an object to be reflected on the NAS server 20.

Next, the operations of the client operation processing unit 11 and data change reflection processing unit 12, which are executed by use of this cache management table 131, will be described in detail.

Figure 5:
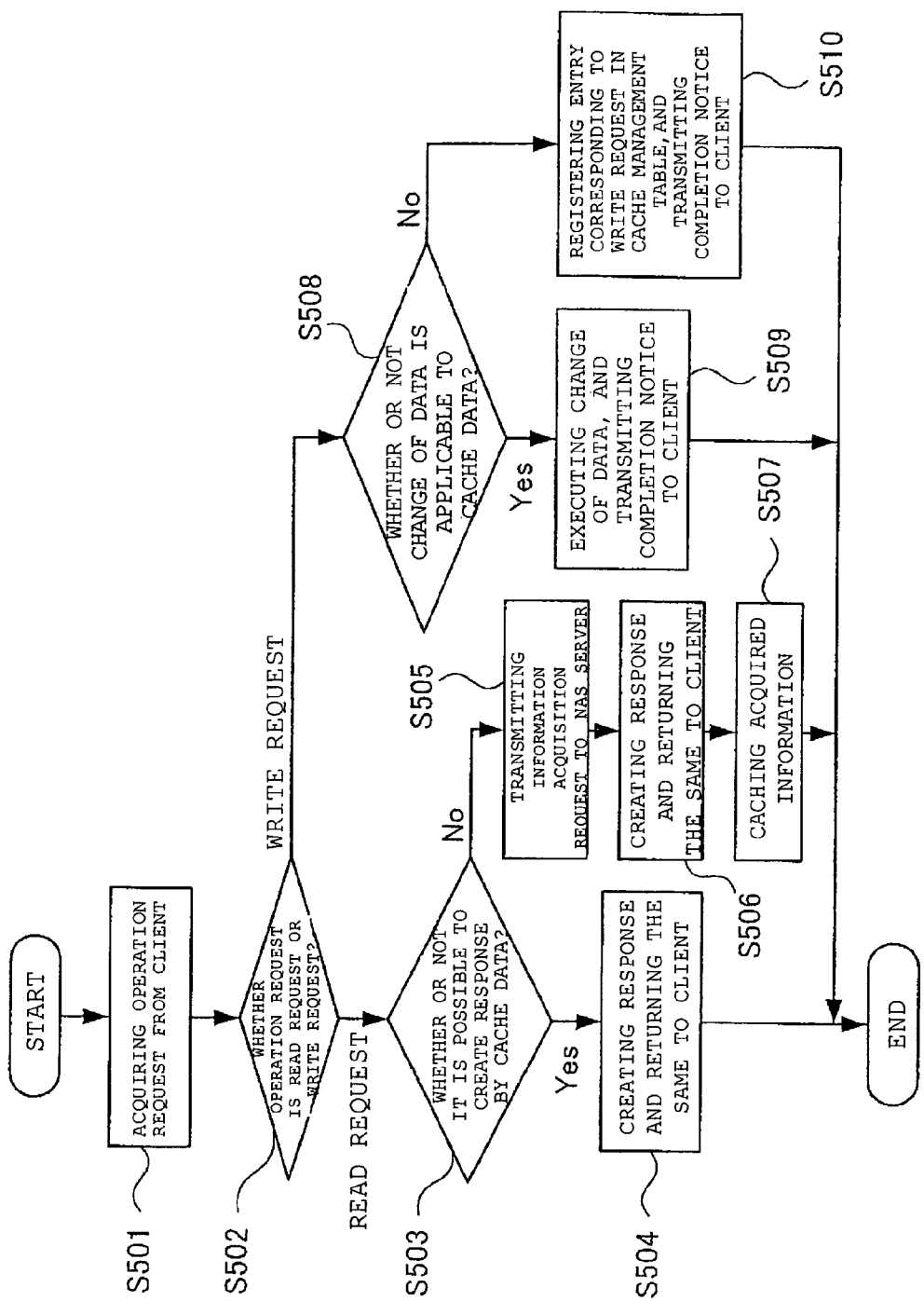
FIG. 5 is a flowchart explaining operations by a client operation processing unit in this embodiment.

FIG. 5 is a flowchart explaining the operations by the client operation processing unit 11.

As shown in FIG. 5, upon receiving an operation request from the client 30 (Step 501), the client operation processing unit 11 examines whether the operation request is a read request or a write request.

When the received operation request is a read request, the client operation processing unit 11 executes a reference operation. Specifically, the client operation processing unit 11 retrieves the respective entries registered in the cache management table 131, and determines whether or not cache data corresponding to a handle included in the read request is present and it is possible to create a response to the client 30 by use of the cache data (Steps 502 and 503). If it is possible to create the response to the client 30, the client operation processing unit 11 creates the response, updates the reference order management information of the entry, and returns the created response to the client 30 (Step 504).

On the other hand, if it is impossible to create the response to the client 30, the client operation processing unit 11 transmits an information acquisition request (read request of data and the like) to the NAS server 20 in order to acquire information required for creating the response (Step 505). Thereafter, after acquiring a response from the NAS server 20, the client operation processing unit 11 creates a response to the client 30 and returns the response thereto (Step 506). Accompanied with this operation, a field for a reflected state of the entry to be registered is set at the "end of processing." Information acquired at this time is cached, an entry of the cache data is registered in the cache management table 131, and thus the entry is made usable for processing for operation requests to the same information thereafter (Step 507). When there is no free storage area in a memory prepared for the cache management table 131, among entries of which reflected states are the "end of processing," one entry is selected in LRU (Least Recently Used) order by referring to the reference order management information, and namely, one entry to which no access has been made for the longest time is selected. Then, the selected entry is deleted, and thus a free capacity is ensured, into which the entry is then registered. When the free capacity is still short after the deletion, the above-described selection and deletion are repeated until the free capacity can be ensured. Note that, instead of selecting one entry in LRU order, an entry in which the number of accesses made thereto is estimated to be the least in the future may be selected by other technique, for example, based on the latest reference frequency and the like. Similarly, sections regarding the selection of the entry in LRU order in the description below can be rewritten such that the other technique can be alternatively used. Moreover, in the case of the selection and the deletion of the entry for the purpose of ensuring the free capacity, it is also conceivable to select and delete a plurality of the entries in a lump in order to reduce execution overheads thereof. Similarly, in the case of the selection and the deletion of the entry in the description below, the plurality of entries may be selected and deleted in a lump.

When the operation request received from the client 30 is a write request, the client operation processing unit 11 executes change processing. Specifically, the client operation processing unit 11 retrieves the respective entries registered in the cache management table 131, and determines whether or not cache data corresponding to a handle included in the write request from the client 30 is present and it is possible to apply a change of data based on the received write request to the cache data (Steps 502 and 508). If it is possible to apply the change of data to the cache data, the client operation processing unit 11 changes the data, updates the reference order management information of the entry, and transmits a completion notice to the client 30 (Step 509).

On the other hand, if it is impossible to apply the change of data based on the write request to the cache data, the client operation processing unit 11 registers an entry corresponding to the write request in the cache management table 131, and transmits a completion notice to the client 30 (Step 510). A field for a reflected state of the entry is set at the "unprocessed." When there is no free storage area in the memory prepared for the cache management table 131, among the entries of which reflected states are the "end of processing," one entry is selected in LRU (Least Recently Used) order by referring to the reference order management information, deleted, and the entry is registered therein.

Note that the client operation processing unit 11 can search a plurality of mergeable operation requests to merge the operation requests in one operation request in the case of applying the change of data to the cache data in Step 509, in the case of registering the entry corresponding to the write request in the cache management table 131 in Step 510, or asynchronously with a series of the operations shown in FIG. 5.

Figure 6:
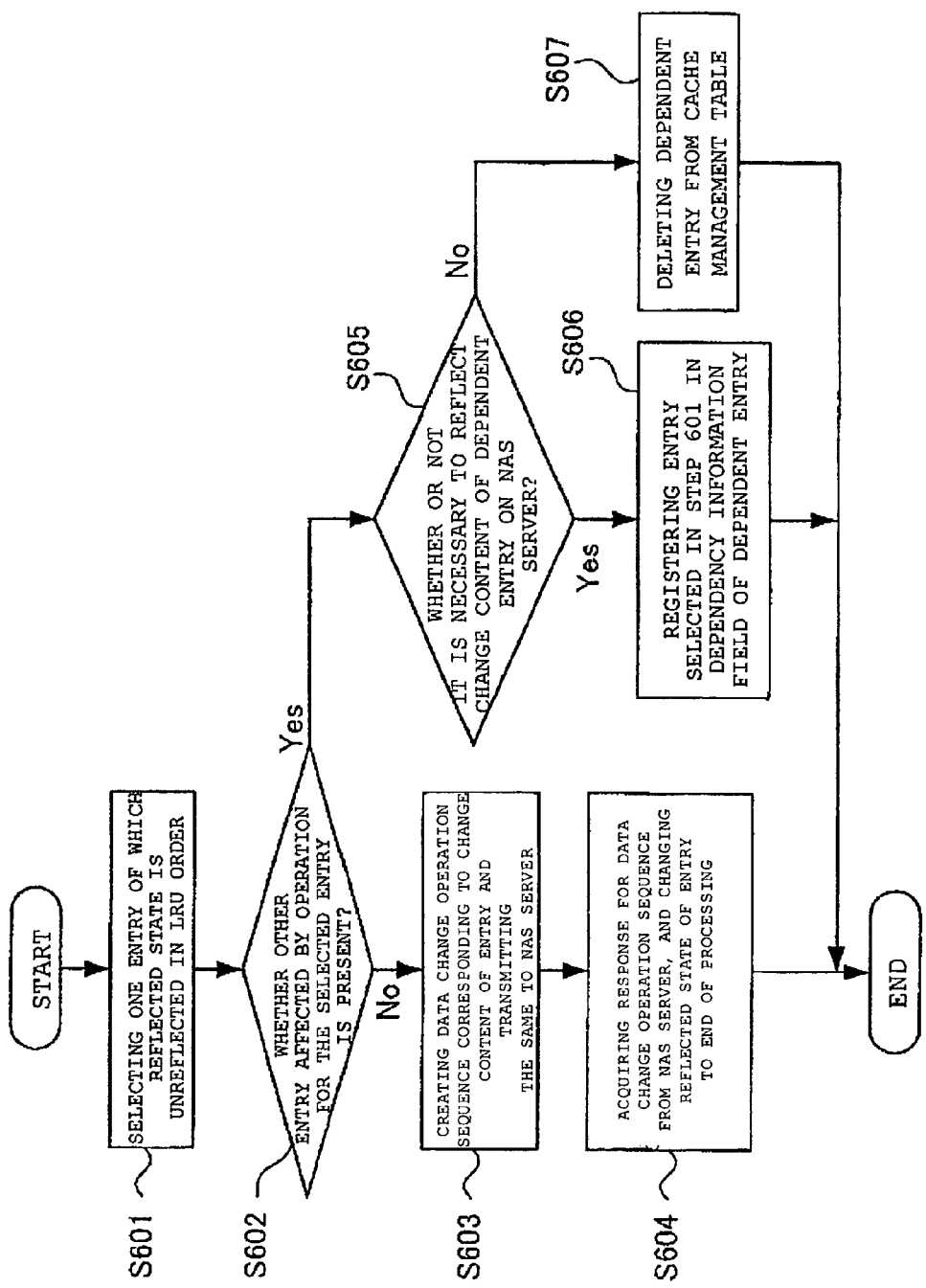
FIG. 6 is a flowchart explaining operations by a data change reflection processing unit in this embodiment.

FIG. 6 is a flowchart explaining the operations by the data change reflection processing unit 12.

The data change reflection processing unit 12 executes the processings shown in FIG. 6 such that the number of processings executed simultaneously can be a value in which the NAS server 20 can be operated most efficiently in accordance with the state of the operation load of the NAS server 20. In general, the larger the number of processings executed simultaneously is, the more efficiently the NAS server 20 can be operated by making full use of a parallel degree of the processings. However, if the number of processings executed simultaneously exceeds a predetermined limit, the execution efficiency is reduced conversely due to an overhead managing the parallel processings. The suitable number of processings executed simultaneously may be obtained by measurement in advance, or may be dynamically adjusted while measuring the performance of the NAS server 20 during the execution.

The data change reflection processing unit 12 first refers to the reference order management information and the reflected states in the respective entries of the cache management table 131, and selects one entry of which reflected state is unreflected in LRU order (Step 601).

When the selected entry is an entry regarding a directory, next, the data change reflection processing unit 12 verifies whether other entry affected by a change operation for the concerned entry is present (Step 602). Specifically, the data change reflection processing unit 12 refers to the cache management table 131, and retrieves such an entry regarding a directory or a file of which path name indicates that the directory or the file is located immediately under the concerned directory. Then, the data change reflection processing unit 12 examines whether such the entry is affected by the change operation. Here, that the entry is affected by the change operation means that, accompanied with the change operation for the entry selected in Step 601, it will be necessary to change lower directory and file thereof. For example, in the case of changing a directory name of a predetermined directory, accompanied with this, it will also be necessary to change path names of lower directory and file of the directory. In other words, entries regarding the directory and file as described above depend on the entry selected in Step 601. Accordingly, if an entry having such a dependency with the entry selected in Step 601 is present, the entry is detected. An analysis method for the dependency in the directories and the files will be described later.

When the entry (hereinafter, referred to as a dependent entry) in the lower directory, which is affected by the change operation for the entry selected in Step 601, is not present, the data change reflection processing unit 12 changes the reflected state of the entry selected in Step 601 during the processings. Then, the data change reflection processing unit 12 creates a data change operation sequence corresponding to the change content of the entry, and transmits the data change operation sequence to the NAS server 20 (Step 603). Based on the data change operation sequence, the NAS server 20 executes a write operation of the data, and then returns a response notifying a write completion to the front-end server 10. If the response for the data change operation sequence is returned from the NAS server 20, the front-end server 10 changes the reflected state of the entry to the end of processing (Step 604).

When the dependent entry affected by the change operation for the entry selected in Step 601 is present, next, the data change reflection processing unit 12 examines whether or not it is necessary to reflect the change content of the dependent entry on the corresponding file of the NAS server 20 (Step 605). Here, the case where it is not necessary to reflect the change content of the dependent entry on the corresponding file of the NAS server 20 is a case where the change to the dependent entry becomes nullified by other subsequent operations.

When it is necessary to reflect the change content of the dependent entry to the corresponding file of the NAS server 20, the data change reflection processing unit 12 registers the entry selected in Step 601 in the dependency information field of the dependent entry (Step 606). When the other entry is already registered in the dependency information field, this means that the dependent entry has a dependency relation also with the other entry. Accordingly, in such a case, the data change reflection processing unit 12 sequentially traces the entries registered in the dependency information field, and registers the entry selected in Step 601 in the dependency information field if the data change reflection processing unit 12 reaches an entry which is not registered in the dependency information field. Then, with regard to the entry selected in Step 601, the status of the reflected state is set at the "dependency resolution pending."

On the other hand, when it is not necessary to reflect the change content of the dependent entry to the corresponding file of the NAS server 20, the data change reflection processing unit 12 deletes the dependent entry from the cache management table 131 (Step 607). When the other entry is registered in the dependency information field of the dependent entry, the data change reflection processing unit 12 changes the status of the reflected state of the other entry from the "dependency resolution pending" to "unreflected."

Here, the analysis method for the dependency in the directories and the files will be described.

This analysis of the dependency is executed in accordance with the specification of the communication protocol between the front-end server 10 and the NAS server 20.

When stateless (that is, without a state (information of the status of the directories and the files)) communication protocol such as NFSv2 (NFS version 2) and NFSv3 (NFS version 3) is used for the communication between the front-end server 10 and the NAS server 20, the tree structure of the file system of the NAS server 20 is constructed and managed in the front-end server 10, and the dependency is analyzed based on a positional relationship of the directories and the files in the tree structure. Information required for constructing the tree structure is acquired by which the front end accesses the NAS server according to needs. The constructed tree structure is held in the main memory 103 in FIG. 2, the non-volatile memory 110 in FIG. 2, which constitutes the cache memory 13, and the like.

In the stateless communication protocol, it is not necessary to hold, in the client, an operation request received by the server once. It is assured that the operation request is certainly held on the server side even if a failure occurs in the server. A write request that is still not reflected (that is, pending) on the NAS server 20 though received from the client 30 is placed in the front-end server 10. It is necessary to reflect the pending write request on the NAS server 20 even if a change operation (for example, a write-inhibiting operation for an object file of the write request) is performed for a higher directory. Therefore, it is necessary to suitably control the order of reflecting the change operation for the object file and the change operation for the higher directory on the NAS sever 20. Such a necessity leads to a necessity of grasping what relationships the respective operations from the client 30 mutually have in the tree structure of the file system of the NAS server 20. Therefore, as described above, the tree structure is held and managed in the front-end server 10.

Meanwhile, when communication protocol provided with a state, such as NFSv4 (NFS version 4), is used for the communication between the front-end server 10 and the NAS server 20, all of the directories and files associated with the pending operation request are set in an open status (or in a cache assigned status), thus making it possible to reflect a pending change on the NAS server 20 no matter how the status of the higher directory may be changed.

Unlike the foregoing stateless communication protocol, in the communication protocol provided with the state, explicit recovery processing is required on the client side when the server recovers from the failure. Specifically, the client and the server hold an explicit connection there between for each file and directory. When this connection is disconnected due to some failure, each of the client and the server performs the explicit recovery processing. Meanwhile, as long as the connection is held on the client, it is possible to reflect the change operation pending for each file on the server no matter how the status of the higher directory may be changed. Therefore, it becomes unnecessary to grasp the tree structure of the file system of the NAS server 20 in the front-end server 10 when the communication protocol having a state such as an NFSv4 is used. Although it is necessary to check whether or not a file handle affected by the change operation performed for the directory is present, this checking can be realized by inquiring of the NAS server 20 at the time of the change operation for the directory even if the tree structure is not held.

In any of the cases of the stateless communication protocol and the communication protocol provided with the state, in the processing for reflecting the change of data on the NAS server 20, the status of the data in the NAS server 20 and the status of the data on the cache of the front-end server 10 are managed independently of each other. Specifically, even if the change of the status of the data is unreflected on the NAS server 20, the processing is executed in consideration of the effect of the status change in the operation to the cache on the front end.

As described above, in this embodiment, the optimization can be performed based on the dependency between the operations in the case of creating the operation request for the NAS server 20 by the data change reflection processing unit 12. Next, the optimization will be described by giving specific examples.

(A) Optimization by Merging Data Write Operation for NAS Server 20.

When the plurality of operation requests for the data write are the ones for an area where the files are continuous, these operation requests can be merged to create one data change operation sequence, and the NAS server 20 can be allowed to execute the created data change operation sequence. As compared with the case of creating the data change operation sequence for each operation request and allowing the NAS server 20 to execute the created data change operation sequence, in this case, a seek in the hard disk device of the NAS server 20 is reduced, and the number of change operations to be processed by the processor of the NAS server 20 is reduced. Therefore, the period of time required for the processings can be shortened.

However, in this case, if the reflection of the merged change operations on the NAS server 20 is delayed, and the other operation, for example, the write-inhibiting operation of the file is reflected on the NAS server 20 prior thereto, a change operation that follows to reflect the change operation on the NAS server 20 would result in an error. Because it is necessary to reflect the write request received from the client 30 on the NAS server 20 without fail, such an error must be prevented. Therefore, it is necessary to explicitly control the operation of the data write and the inhibiting operation of the data write so as not to be exchanged in the order.

In the NFS protocol, the operation of the data write and the inhibiting operation of the data write are operation for the same handle. Hence, when the communication protocol between the servers is the NFS protocol, the execution of the cache management per handle will tell that the operations are performed for the same handle. Thus, the control described here is enabled.

(B) Optimization by Omission of Data Write Operation for File Subjected to Change Operation When the File is Deleted.

In an operation of an application program operating in the client 30, in some cases, such operations as described below are performed. Predetermined data is created, an interim result thereof is temporarily written as a file into the storage device (NAS server 20), and the content of the file is read in subsequent processing, followed by the deletion of the file.

In the NFS protocol, the deletion operation of the file is defined as an operation of the concerned file to the higher directory in the tree structure of the file system. On the other hand, only a simple comparison of handles cannot determine the order of two handles on the tree structure, that is, which of the two handles are higher than the other. In this embodiment, the parentage (path names) on the tree structure is managed in the cache management table 131. Therefore, a dependency between the operation of the data write and the deletion operation of the file can be determined. As a result, it is made possible to omit a reflection of such an operation of data write of which effect is cancelled by the deletion operation of the file on the NAS server 20. In such a way, the processing time required for completing the deletion of the file is shortened.

In this embodiment, the communication protocol between the front-end server 10 and the NAS server 20 is set as protocol provided with a cache management assigning mechanism for the client 30, such as NFSv4, thus making it possible to assign a part of the cache management function to the front-end server 10 without changing the functional configuration of the NAS server 20.

In the cache management assigning mechanism of NFSv4, it is possible to assign, to the NFS client side, a right of accessing data of a file when the file is opened and a right of locking a specific area on the file. If the front-end server 10 acquires the right of accessing a predetermined file by such a function, it is made possible for the front-end server 10 replacing the NAS server 20 to execute operation for the file, and specifically, the reference operation, the change operation and the locking operation.

Thus, it is made possible to execute a part of the processings for the operation request from the client 30 only by the operation of the front-end server 10 without depending on the NAS server 20, and therefore, the load of the NAS server 20 can be reduced to improve a throughput thereof.

Furthermore, in this embodiment, the processing requests from the plurality of clients 30 are collected and sent to the NAS server 20 by the function of the client cache in the front-end server 10. Specifically, as described above, the operation requests received from the clients 30 are merged, the change operations executable in a lump in the case of reflecting the change of the data on the NAS server 20 are merged into one operation to be reflected on the NAS server 20, and so on. Besides the above, in the case of using NFSv4 as the communication protocol between the front-end server 10 and the NAs server 20, the reference operation, the change operation and the locking operation, which are executable by the front-end server 10, can be processed by the front-end server 10 replacing the NAS server 20. Therefore, the operation efficiency of the NAS server 20 can be improved.

Moreover, when an access is made to the cache data of which management is assigned to the NFS client from the other NFS clients, NFSv4 has a function to call back to the NFS client to which the management of the cache data is assigned. Therefore, even in the case of setting the plurality of front-end servers 10 for the NAS server 20 on the network, the information concerning the operations is shared among the respective front-end servers 10 by the callback from the NAS server 20 to the front-end server 10. Specifically, because the operation by the predetermined front-end server 10 is notified to the other front-end servers 10, the consistency of the operations in the respective front-end servers 10 can be maintained. Hence, it is possible to realize various configurations, such as the plurality of front-end servers 10 for one NAS server 20, and the plurality of front-end servers for the plurality of NAS servers 20, in accordance with the status of the accesses from the clients 30 and status of the load of the NAS server 20.

As described above, according to the present invention, the front-end server is interposed between the NAS server and the clients on the network, thus making it possible to provide the effective cache system in the computer system utilized on the network.

Moreover, according to the present invention, it is made possible to realize the efficient memory management in the NAS server 20 by use of such the cache system.

The present invention thus describes a network system, front-end server and method that improves operations in a NAS server. The front-end server, which couples a client and the NAS server, includes a cache memory for holding at least one operation request directed from a client device to the NAS. The front-end server also has a client operation processing unit for receiving one or more operation requests from the client. The client operation processing unit is also capable of performing operations, based on the operation requests, using data in the cache memory in the front-end server. The front-end server also has a data change reflection processing unit that can create an operation sequence, which may be either a directive to change data in the NAS or a series of execution code, which is sent to the NAS. The client operation processing unit can also merge compatible instructions, received from the client, to create a combined operation request. The combined operation request can be executed either in the front-end server using data in the cache in the front end-server, or can be executed in the NAS using data stored in the NAS. Either way, the results of the operation of the client operation processing unit, known as operation sequences, are sent to the NAS. If the operation sequence is a series of code to be executed in the NAS, the client operation processing unit can restructure the code to a pipelined form, such that the NAS can execute the operation sequence in parallel.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Although the preferred embodiment of the present invention has been described in detail, it should be understood that various changes, substitutions and alternations can be made therein without departing from spirit and scope of the inventions as defined by the appended claims.

What is claimed is:

1. A method comprising:
    holding, in a cache memory in a front-end server, at least one operation request directed from a client device to a NAS (Network Attached Storage) server, the client device and the NAS server being coupled via the front-end server;
    receiving, at a client operation processing unit in the front-end server, said at least one operation request from the client device;
    performing, in the client operation processing unit, an operation based on said at least one operation request by using cache data stored in the cache memory;
    creating, in a data change reflection processing unit in the front-end server, at least one operation sequence, the created at least one operation sequence being a result of an operation performed by the client operation processing unit in response to the received at least one operation request from the client device; and
    transmitting, by the data change reflection processing unit, the created at least one operation sequence to the NAS server;
    wherein, in response to a determination that multiple operation requests from the client device are compatible for merging the client operation processing unit synthesizes a plurality of the operation requests received from the client device into one combined operation request, and the client operation processing unit executes the combined operation request using the cache data in the front-end server to create the created at least one operation sequence.

2. The method of claim 1, wherein the created at least one operation sequence sent to the NAS server is a directive to directly change data stored in the NAS server, the directive based on results of the client operation processing unit executing the combined operation request using data in the cache memory in the front-end server.

3. The method of claim 1, wherein in response to a determination that multiple operation requests from the client device are compatible for merging, the client operation processing unit synthesizes a plurality of the operation requests received from the client device into one combined operation request, and wherein the created operation sequence sent to the NAS server is the combined operation request to be executed by the NAS server using data stored in the NAS server.

4. The method of claim 3, wherein the series of instructions are pipelined when sent to the NAS server for parallel execution.

5. The method of claim 1, wherein the cache memory is a non-volatile recording medium.

* * * * *